UNITED STATES PATENT OFFICE.

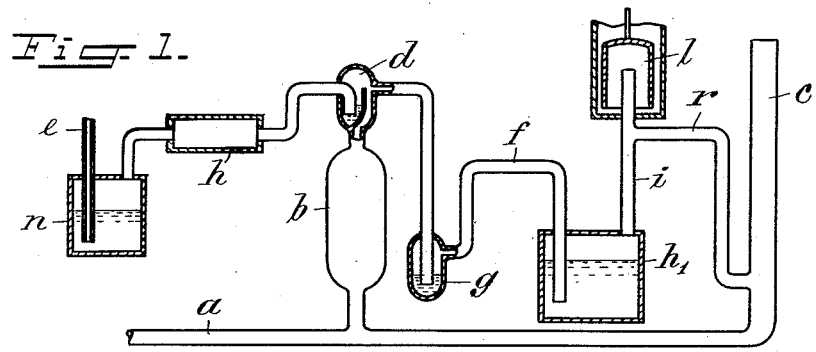
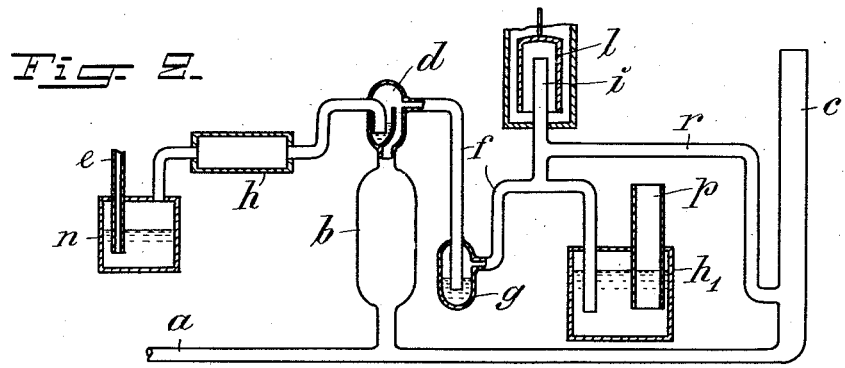
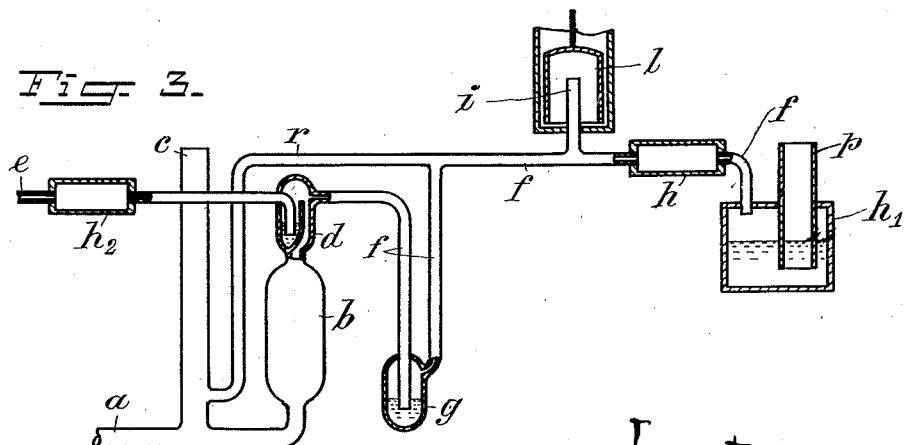

OLOF RODHE, OF STOCKHOLM, SWEDEN, ASSIGNOR TO SVENSKA AKTIEBOLAGET MONO, OF STOCKHOLM, SWEDEN, A CORPORATION.

GAS-ANALYSIS APPARATUS.

1,340,838. Specification of Letters Patent. Patented May 18, 1920.

Original application filed February 5, 1916, Serial No. 76,412. Divided and this application filed November 23, 1918. Serial No. 263,914.

*To all whom it may concern:*

Be it known that I, OLOF RODHE, engineer, subject of the King of Sweden, residing at 54 Odengatan, Stockholm, Sweden, have invented certain new and useful Improvements in Gas-Analysis Appaartus, of which the following is a specification.

The present invention has reference to automatically working apparatus for gas analyzing purposes, and its object is to make it possible to investigate the percentage of methane in a gas mixture containing methane.

According to the invention an oven is inserted before the two usual measuring receptacles, the said oven being provided with a metal or an oxid of a metal, which, when heated, oxidizes the methane so that it is transformed into carbon dioxid. By measuring the gas mixture, when it streams from the oven, by absorbing the carbon dioxid in the mixture, and by measuring once again a difference is obtained and said difference in the two gas volumes will correspond to the quantity of carbon dioxid. As, however, the volume hereof is the same as the volume of the methane before the gas mixture was introduced in the oven, the said difference in the two volumes as measured corresponds to the volume of the methane in the gas mixture.

On the accompanying drawing three embodiments of the invention are schematically shown in Figures 1, 2 and 3.

In Fig. 1 $e$ designates a pipe through which the gas mixture is introduced, and $n$ is a receptacle containing an absorbent medium for carbon dioxid, preferably a potash solution. $a$ is the pipe, leading from a liquid pump, for instance a mercury pump of any suitable construction which causes the liquid to intermittently rise and fall in the first measuring receptacle $b$ and in the pipe $c$. When the liquid falls in $b$, the gas to be measured is sucked in from the pipe $e$ through the liquid seal $d$.

From $n$ the gas mixture is forced or sucked to the oven $h$ which contains a reagent for oxidizing the methane to carbon dioxid, for instance a metal oxid, preferably iron oxid in finely divided state.

The gas mixture, leaving the oven $h$, contains no methane but a volume of carbon dioxid equal to the volume of methane before the gas mixture was introduced in $h$. $b$ is a first measuring receptacle in which the gas volume is measured. Through pipe $f$ and liquid seal $g$ the gas is pressed or sucked to the absorbing receptacle $h_1$ containing a medium absorbing the carbon dioxid in the gas mixture, such as a potash solution. The carbon dioxid is absorbed and the gas mixture is now introduced through the pipe $i$ into the second measuring receptacle $l$ in which the gas volume is again measured. From $l$ the gas escapes in any known way from gas analysis apparatus.

The difference in the two volumes of the gas when measured in $b$ and in $l$ is equal to the volume of methane in the gas mixture before it was introduced in the oven $h$.

$r$ is a pipe, permitting the gas in $l$ to leave said receptacle as well as $i$ and $h_1$ as soon as the liquid in $c$ has fallen below the opening of said pipe $r$.

The embodiment of the invention as shown in Fig. 2 differs from that shown in Fig. 1 in that the second measuring receptacle $l$ is arranged "in parallel" to the receptacle $h_1$, as the pipe $i$ branches from the pipe $f$. The receptacle $l$ acts when the pressure in the pipes $i$ and $f$ has reached a certain value. In the receptacle $h_1$ there is in this case inserted a pipe $p$ so that the liquid in $h_1$ can rise in said pipe when the pressure in the piping system augments.

The metal oxid is heated to a temperature of 400° to 1000° Celsius. The most suitable temperature is 800° and the heating is preferably effected by electrical means.

Fig. 3 shows an embodiment where the total percentage of carbon monoxid and methane (or other hydrocarbon) is to be determined when the gas mixture contains oxygen. In such a case two ovens are used, the first one $h_2$ being arranged in the pipe $e$ before the first measuring receptacle $b$, the second one $h$ between the receptacle $b$ and the absorption vessel $h_1$. The oven $h_2$ contains a finely granulated metal (preferably iron or copper) and has for its object to absorb the oxygen contained in the gas mixture. The oven $h$ on the contrary contains an oxid of metal and has the same action as in Figs. 1 and 2.

In this embodiment the two ovens can be joined to a single one arranged at $h_2$, in which case this single oven may contain a finely granulated metal as well as a metal oxid. The metal will absorb the oxygen and the metal oxid will transform methane and carbon monoxid into carbon dioxid. This is then measured as in Fig. 2.

It can be easily understood, that the second measuring receptacle $l$ in Fig. 3 can be arranged "in series" after the receptacle $h_1$, as in Fig. 1.

The metal or metal oxid may be used as a solid mass, produced, for instance, by sintering the pulverulent metal or metal oxid.

Claims.

1. In automatic gas analysis apparatus for determining the volume of methane in a gas mixture, the combination of an oven containing an oxidizing reagent, a measuring receptacle for determining the volume of gas mixture delivered by said oven, an absorption receptacle for eliminating carbon dioxid from the gas mixture, and a second measuring receptacle for determining the volume of the gas mixture after the carbon dioxid has been eliminated.

2. Gas analysis apparatus of the character set forth in Claim 1, in combination with another oven containing a reducing reagent for eliminating oxygen from the gas mixture before said mixture passes to the first measuring receptacle.

In testimony whereof I affix my signature in presence of two witnesses.

OLOF RODHE.

Witnesses:
 JACOB BAGGE,
 HELGE ANDERSSAN.